(12) United States Patent
Bandiera et al.

(10) Patent No.: US 10,191,719 B2
(45) Date of Patent: Jan. 29, 2019

(54) MRAM-BASED PROGRAMMABLE MAGNETIC DEVICE FOR GENERATING RANDOM NUMBERS

(71) Applicant: CROCUS Technology SA, Grenoble (FR)

(72) Inventors: Sebastien Bandiera; Quentin Stainer, Montbonnot-St-Martin (FR)

(73) Assignee: CROCUS TECHNOLOGY SA, Grenoble (FR)

(*) Notice: Subject to any disclaimer, the term of this patent is extended or adjusted under 35 U.S.C. 154(b) by 0 days.

(21) Appl. No.: 15/552,508

(22) PCT Filed: Feb. 22, 2016

(86) PCT No.: PCT/IB2016/050935
§ 371 (c)(1),
(2) Date: Aug. 22, 2017

(87) PCT Pub. No.: WO2016/135611
PCT Pub. Date: Sep. 1, 2016

(65) Prior Publication Data
US 2018/0336014 A1    Nov. 22, 2018

(30) Foreign Application Priority Data
Feb. 24, 2015   (EP) .................................... 15290039

(51) Int. Cl.
*G06F 7/58*    (2006.01)
(52) U.S. Cl.
CPC .................... *G06F 7/588* (2013.01)

(58) Field of Classification Search
CPC ................................... G06F 7/58; G06F 7/588
See application file for complete search history.

(56) References Cited

U.S. PATENT DOCUMENTS

| 2010/0109660 A1 | 5/2010 | Wang et al. |
| 2010/0174766 A1 | 7/2010 | Weeks et al. |

(Continued)

FOREIGN PATENT DOCUMENTS

| EP | 2163984 A1 | 3/2010 |
| WO | 2010096768 A1 | 8/2010 |

OTHER PUBLICATIONS

International Search Report for PCT/IB2016/050935 dated Apr. 18, 2016.

(Continued)

*Primary Examiner* — Chuong D Ngo
(74) *Attorney, Agent, or Firm* — Pearne & Gordon LLP

(57) ABSTRACT

A programmable magnetic device for generating random numbers during a programming operation, including an array of a plurality of magnetic tunnel junctions. Each magnetic tunnel junction includes a reference layer having a reference magnetization; a tunnel barrier layer; and a storage layer having a storage magnetization. The programmable magnetic device is arranged such that, during the programming operation, the storage magnetization is orientable in an unstable magnetization configuration and relaxable randomly in one of a plurality of stable or metastable configurations from the unstable magnetization configuration.

17 Claims, 6 Drawing Sheets

(56) References Cited

U.S. PATENT DOCUMENTS

| | | | |
|---|---|---|---|
| 2011/0123022 A1* | 5/2011 | Oishi | G06F 7/588 380/46 |
| 2011/0194337 A1* | 8/2011 | Wang | B82Y 25/00 365/158 |
| 2012/0026784 A1 | 2/2012 | Kanai et al. | |
| 2013/0073598 A1* | 3/2013 | Jacobson | G06F 7/588 708/252 |

OTHER PUBLICATIONS

Written Opinion for PCT/IB2016/050935 dated Apr. 18, 2016.
Moessner, Roderich et al: "Geometrical Frustration", Physics Today, Feb. 24, 2006, XP055210487.
Pollmann F et al: "Classical correlations of defects in lattices with geometrical frustration in the motion of a particle", arxiv.org, Cornell University Library, 201 Olin Library Cornell University Ithaca, NY 14853, Apr. 28, 2006, XP080233871.

* cited by examiner

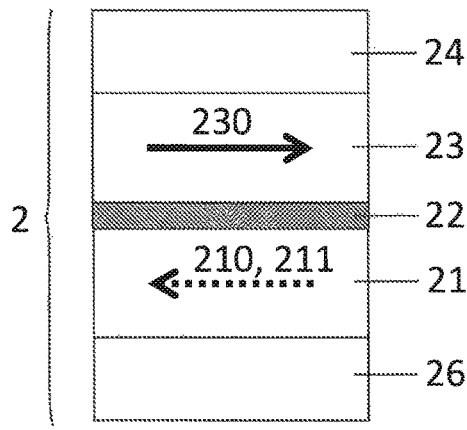
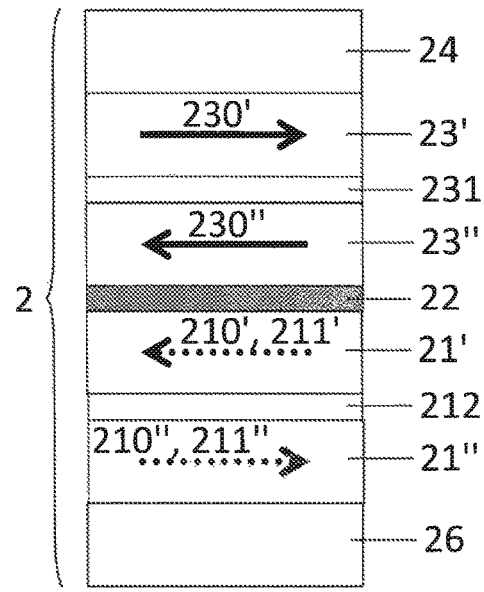
Fig. 2
Fig. 3
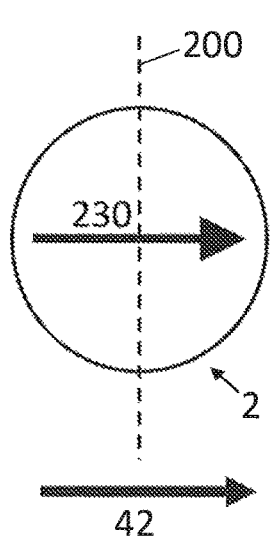
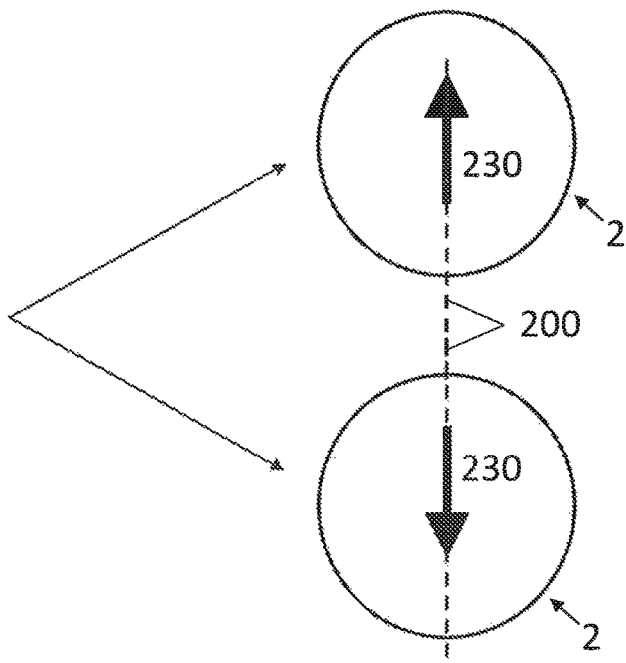
Fig. 4(a)
Fig. 4(b)

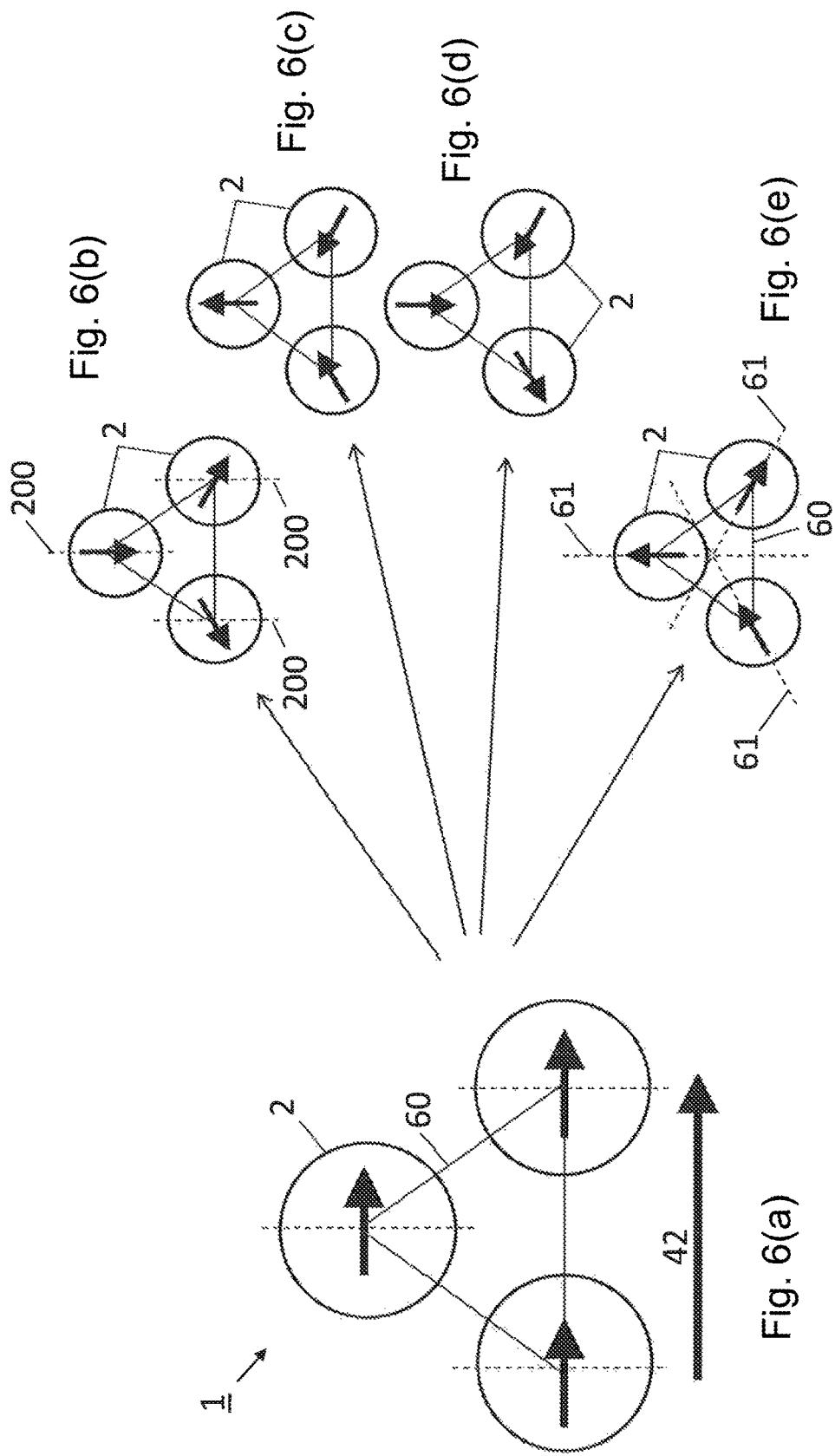

MRAM-BASED PROGRAMMABLE MAGNETIC DEVICE FOR GENERATING RANDOM NUMBERS

FIELD

The present disclosure concerns a MRAM-based programmable magnetic device for generating random numbers. The present disclosure is also concerned by a method for programming a random number in the magnetic device and for reading said random number.

DESCRIPTION OF RELATED ART

As wireless technology becomes ever more prevalent, security has been an important issue in wireless communications. To generate secure keys for wireless communications, it is critical to have an entropy source based on 'true' random number generator. Currently, pseudo random number generators based on CMOS ring oscillators have been commonly used in wireless chipsets. However, these are inefficient and susceptible to external attacks because of the absence of 'true' random physical process.

Random number generators are thus of great interest for security applications, such as for secure bank cards, SIM cards, etc.

Magnetic tunnel junction based MRAM cells comprise two layers of magnetic metals, such as cobalt-iron, separated by an ultrathin layer of insulator, conventionally aluminum or magnesium oxide with a thickness of about 1 nm. The insulating layer is so thin that electrons can tunnel through the barrier if a bias voltage is applied between the two metal electrodes. In magnetic tunnel junctions the tunneling current, and thus the resistance of the magnetic tunnel junction, depends on the relative orientation of magnetizations of the two ferromagnetic layers, which can be changed by an applied magnetic field.

Data can be written into a MRAM cell by changing a direction of one of the layers of magnetic metals (for example a storage layer) respective to the magnetization of the other layer (for example a reference layer). The MRAM cell has a resistance value that varies depending on the magnetization direction of the storage layer. Data is read from the MRAM cell by passing a small read current, with which no magnetization switching occurs, through the magnetic tunnel junction of the MRAM cell and the resistance value thereof is measured to be determined as a low resistance value or a high resistance value.

Document US2010174766 describes a method and apparatus for generating a random logic bit value. In some embodiments, a spin-polarized current is created by flowing a pulse current through a spin polarizing material. The spin-polarized current is injected in a free layer of a magnetic tunneling junction and a random logical bit value results from a variation in pulse current duration or a variation in thermal properties.

Document US2010109660 discloses a random number generator device that utilizes a magnetic tunnel junction. An AC current having an amplitude and a frequency is provided through the free layer of the magnetic tunnel junction, the AC current being configured to switch the magnetization orientation of the free layer via thermal magnetization.

Document Roderich Moessner et. al., "Geometrical Frustration", Physics Today, 2006-02-24 discusses phenomena occurring when interactions between magnetic degrees of freedom in a lattice are incompatible with the underlying crystal geometry.

SUMMARY

The present disclosure concerns a MRAM-based programmable magnetic device for generating random numbers during a programming operation, comprising an array of a plurality of magnetic tunnel junctions, each magnetic tunnel junction comprising a reference layer having a reference magnetization; a tunnel barrier layer; and a storage layer having a storage magnetization; the programmable magnetic device being arranged such that, during the programming operation, the storage magnetization is orientable in an unstable magnetization configuration and relaxable randomly in one of a plurality of stable or metastable configurations from the unstable magnetization configuration, wherein said unstable magnetization configuration and said plurality of stable or metastable configurations are determined by magnetic interactions resulting from the arrangement of the storage layer within the magnetic tunnel junctions and/or the arrangement of the magnetic tunnel junctions within the array.

The present disclosure further concerns a method for operating the programmable magnetic device, comprising,
  during a programming operation, heating the magnetic tunnel junction to a predetermined high temperature such as to orient the storage magnetization in the unstable magnetization configuration; and
  cooling the magnetic tunnel junction to a predetermined low temperature such as to let the storage magnetization relax randomly in one of said plurality of stable or metastable configurations; and
  during a read operation, determining the programmed state of the programmed magnetic tunnel junctions corresponding to the storage magnetization being oriented in one of said plurality of stable or metastable configurations.

An advantage of the programmable magnetic device disclosed herein is that it is small in size, needs little energy to work, allows for easy integration, and also allows generated data to be retained in a nonvolatile manner. Moreover, the magnetic tunnel junctions used in this random number generator can also be used for a magnetic sensor device, and/or a memory device, and/or a logic circuit.

BRIEF DESCRIPTION OF THE DRAWINGS

The invention will be better understood with the aid of the description of an embodiment given by way of example and illustrated by the figures, in which:

FIG. 2 shows details of a magnetic tunnel junction 2 implemented in accordance to an embodiment;

FIG. 3 shows details of a magnetic tunnel junction 2 implemented in accordance to another embodiment;

FIGS. 4a and 4b illustrate the programming of a random number in a MRAM cell where a storage and/or a soft reference magnetization is aligned (FIG. 4a) and where the soft reference and/or storage magnetization is relaxed (FIG. 4b), according to an embodiment;

FIGS. 6a to 6e represent the programming of a random number in a programmable magnetic device comprising three MRAM cells arranged in an equilateral triangular lattice;

DETAILED DESCRIPTION OF POSSIBLE EMBODIMENTS OF THE INVENTION

Figure 1:
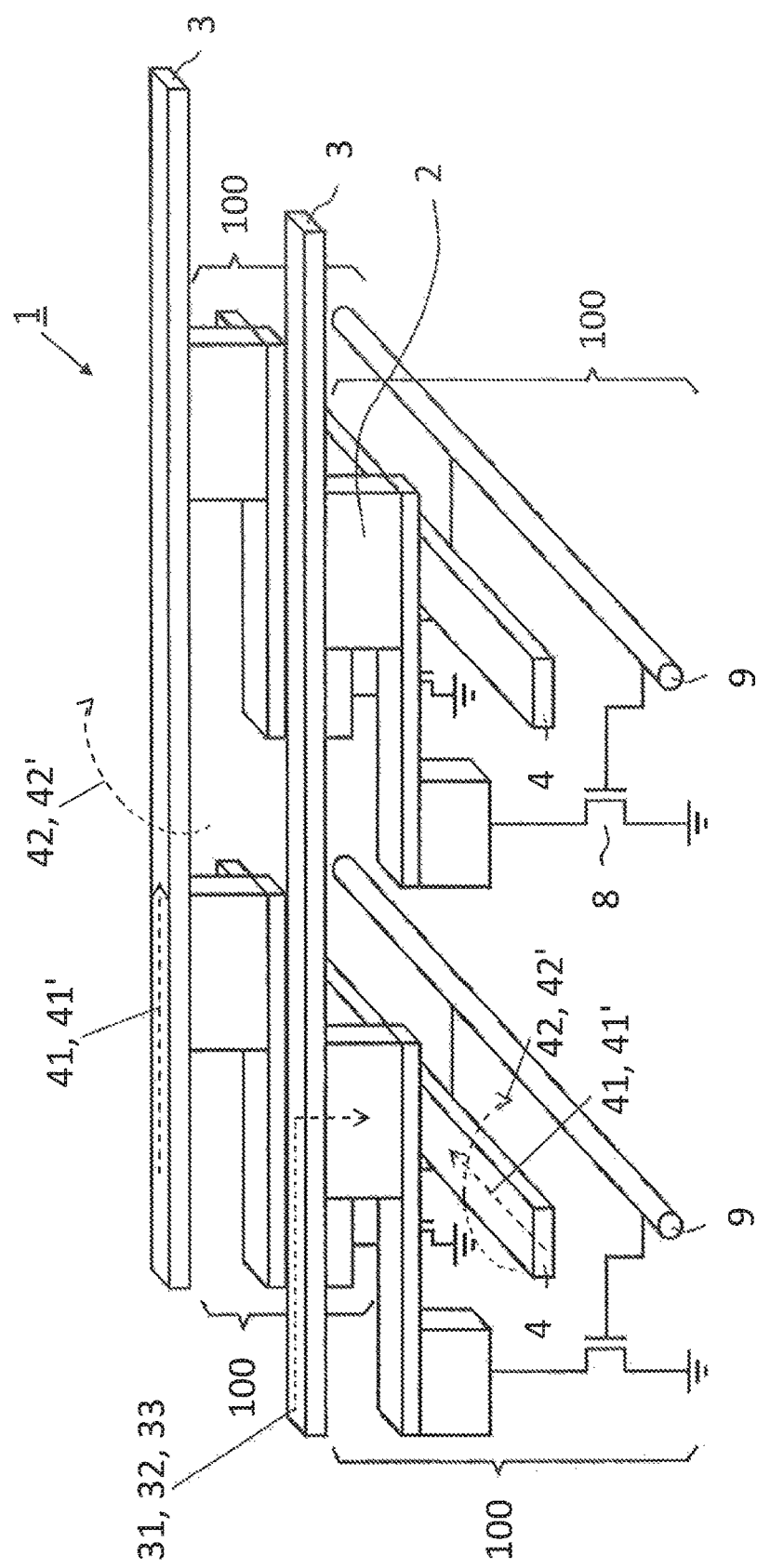
FIG. 1 shows a perspective view of a programmable magnetic device 1 implemented in accordance with an embodiment.

FIG. 1 shows a perspective view of the programmable magnetic device 1 implemented in accordance with an embodiment. In the illustrated embodiment, the magnetic device 1 is a MRAM-based device that includes a set of MRAM cells 100. Each of the MRAM cells 100 includes a magnetic tunnel junction 2 and a selection transistor 8. The magnetic device 1 further includes a set control lines 9, which are electrically coupled to the MRAM cells 100 through their selection transistors 8. The MRAM cells 100 are arranged in rows and columns along substantially orthogonal directions of a square or rectangular array, although other two-dimensional and three-dimensional arrays will be described below. Also, while four MRAM cells 100 are illustrated in FIG. 1, more or less MRAM cells can be included in the magnetic device 1.

Referring to FIG. 1, the magnetic device 1 includes a set of traces or strip conductors to provide write and read functionality. Specifically, a set of current lines 3, which extend across the array in a substantially parallel fashion with respect to one another. Each of the current lines 3 is electrically coupled to the MRAM cells 100 along one row of the array.

The magnetic device 1 can further include a set of field lines 4 extending across the array of the MRAM cells 100 in a substantially parallel fashion with respect to one another, and in a substantially orthogonal fashion with respect to the current lines 3. Each of the field lines 4 can be magnetically coupled to the MRAM cells 100 along one column of the array.

FIG. 2 shows a detail a magnetic tunnel junction 2 according to an embodiment. The magnetic tunnel junction 2 comprises a reference layer 21, a storage layer 23, and a tunnel barrier layer 22 that is disposed between the reference layer 21 and the storage layer 23.

Each of the reference layer 21 and the storage layer 23 includes, or is formed of, a magnetic material and, in particular, a magnetic material of the ferromagnetic type. A ferromagnetic material can be characterized by a substantially planar magnetization with a particular coercivity, which is indicative of a magnitude of a magnetic field to reverse the magnetization after it is driven to saturation in one direction. In general, reference layer 21 and the storage layer 23 can include the same ferromagnetic material or different ferromagnetic materials. Suitable ferromagnetic materials include transition metals, rare earth elements, and their alloys, either with or without main group elements. For example, suitable ferromagnetic materials include iron ("Fe"), cobalt ("Co"), nickel ("Ni"), and their alloys, such as permalloy (or Ni80Fe20); alloys based on Ni, Fe, and boron ("B"); Co90Fe10; and alloys based on Co, Fe, and B. In some instances, alloys based on Ni and Fe (and optionally B) can have a smaller coercivity than alloys based on Co and Fe (and optionally B). A thickness of each of the reference layer 21 and the storage layer 23 can be in the nanometer ("nm") range, such as from about 0.3 nm to about 20 nm or from about 1 nm to about 10 nm. A thickness of the storage layer 23 is preferably from about 0.3 nm to about 5 nm.

The reference layer 21 can include a hard ferromagnetic material, namely one having a relatively high coercivity, such as greater than about 50 Oe. The storage layer 23 can include a soft ferromagnetic material, namely one having a relatively low coercivity, such as no greater than about 50 Oe. In such manner, a magnetization of the storage layer 23, or storage magnetization 230, can be readily varied under low-intensity magnetic fields during read operations, while a magnetization of the reference layer 21, or reference magnetization 210, remains stable.

The tunnel barrier layer 22 includes, or is formed of, an insulating material. Suitable insulating materials include oxides, such as aluminum oxide (e.g., $Al_2O_3$) and magnesium oxide (e.g., MgO). A thickness of the tunnel barrier layer 22 can be in the nm range, such as from about 0.5 nm to about 10 nm.

Other implementations of the reference layer 21 and the storage layer 23 are contemplated. In the exemplary magnetic tunnel junction shown in FIG. 3, either, or both, of the reference layer 21 and the storage layer 23 can include multiple sub-layers in a fashion similar to that of the so-called synthetic antiferromagnet (SAF), or synthetic ferrimagnet (SyF) layer. For example, the reference layer 21 can comprise two reference ferromagnetic layers 21', 21", each having a reference magnetization 210', 210", and a reference coupling layer 212 included between the two reference ferromagnetic layers 21', 21" and producing a magnetic coupling, namely a RKKY coupling, between the two reference magnetizations 210', 210". Similarly, the storage layer 23 can comprise two storage ferromagnetic layer 23', 23", each having a storage magnetization 230', 230", and a storage coupling layer 231 included between the two storage ferromagnetic layer 23', 23" and magnetically coupling the two storage magnetizations 230', 230".

The magnetic tunnel junction 2 can also include a storage pinning layer 24 which is disposed adjacent to the storage layer 23 and, through exchange bias, pins the storage magnetization 230 along a particular direction, when a temperature within, or in the vicinity of, the pinning layer 24 at a first low threshold temperature $T_{L1}$, i.e., below a threshold temperature such as a blocking temperature, a Neel temperature, or another threshold temperature. The pinning layer 24 unpins, or decouples, the storage magnetization 23 when the temperature is at a high threshold temperature $T_H$, i.e., above the threshold temperature, thereby allowing the storage magnetization 230 to be switched to another direction.

The magnetic tunnel junction 2 can also include a reference pinning layer 26 which is disposed adjacent to the reference layer 21 and, through exchange bias, pins the reference magnetization 210 along a particular direction, when a temperature within, or in the vicinity of, the pinning layer 26 at a second low threshold temperature $T_{L2}$, i.e., below a threshold temperature such as a blocking temperature, a Neel temperature, or another threshold temperature. Preferably, the second low threshold temperature $T_{L2}$ is larger than the first low threshold temperature $T_{L1}$ such that the reference magnetization 210 remains pinned when the storage magnetization 230 is unpinned by heating the magnetic tunnel junction 2 at the high threshold temperature $T_H$.

The pinning layers 24 and 26 include, or are formed of, magnetic materials and, in particular, magnetic materials of the antiferromagnetic type. Suitable antiferromagnetic materials include transition metals and their alloys. For example, suitable antiferromagnetic materials include alloys based on manganese ("Mn"), such as alloys based on iridium ("Ir") and Mn (e.g., IrMn); alloys based on Fe and Mn (e.g., FeMn); alloys based on platinum ("Pt") and Mn (e.g., PtMn); and alloys based on Ni and Mn (e.g., NiMn).

In the case where the pinning layer 26 is omitted the reference magnetization 210 is unpinned and can be readily varied, with the substantial absence of exchange bias. In this configuration, the reference layer 21 behaves like a sense layer, or free layer, in a self-referenced magnetic tunnel junction 2. In the remaining description, the unpinned reference layer 21 will be called "soft reference layer" and the unpinned reference magnetization will be called "soft reference magnetization" 211 (see FIG. 2). If the reference layer 21 is a SAF layer, the first reference ferromagnetic layer 21' has a first soft reference magnetization 211' and the second reference ferromagnetic layer 21" has a second soft reference magnetization 211" (see FIG. 3).

In another variant, the pinning layer 24 is omitted and the storage magnetization 230 is unpinned and can be readily varied, with the substantial absence of exchange bias. In the remaining description, the unpinned storage magnetization will be called "soft storage magnetization" 231.

The unstable magnetization configuration and the plurality of stable or metastable configurations are determined by magnetic interactions within the magnetic tunnel junction 2 and/or induced by magnetic interactions with the neighboring magnetic tunnel junctions 2, as will be described below.

Programming the Magnetic Device

In an embodiment, a programming operation comprises the steps of orienting the storage magnetization 230 in an unstable magnetization configuration and of relaxing the storage magnetization 230 randomly in one of a plurality of stable or metastable configurations, from the unstable magnetization configuration.

According to an embodiment, the storage magnetization 230 is oriented in the unstable magnetization configuration by heating the magnetic tunnel junction 2 to a predetermined high temperature. The predetermined high temperature can be defined such as to be greater than $KV/10\ k_B$ where K is the magnetic anisotropy of the magnetic layer, V its magnetic volume and $k_B$ the Boltzmann constant. At the predetermined high temperature, the storage magnetization 230 continuously and randomly switches from one to another of the plurality of stable or metastable configurations, due to thermal activation. After cooling the magnetic tunnel junction 2 to a predetermined low temperature, the storage magnetization 230 relaxes, or stabilizes, in one of the stable or metastable configurations. The predetermined low temperature can be defined such as to be lower than $KV/10\ k_B$. The orientation of the stabilized storage magnetization 230 is random, such that repeating the two previous steps is likely to yield a different orientation of the stabilized storage magnetization 230 at each time the steps are repeated. A random number can thus be generated in the programmable magnetic device 1 by using the programming operation.

In another embodiment, the storage magnetization can be oriented in the unstable magnetic configuration by applying a magnetic field 42 on the magnetic tunnel junction 2. When the magnetic field 42 is removed, the storage magnetization 230 relaxes, or stabilizes, in one of the stable or metastable configurations. The orientation of the stabilized storage magnetization 230 is random, such that repeating the two previous steps is likely to yield a different orientation of the stabilized storage magnetization 230 at each time the steps are repeated. A random number can thus be generated in the programmable magnetic device 1 by using the programming operation.

In another embodiment, a combination of heating at a predetermined high temperature threshold and magnetic field 42 can be used during the programming operation.

In an embodiment illustrated in FIGS. 4a and 4b showing a top view of the magnetic tunnel junction 2, the storage layer 23 comprises a magnetic anisotropy axis 200. An unstable magnetization configuration corresponds to a direction of the storage magnetization 230 that is not aligned along the magnetic anisotropy axis 200. For example, an unstable magnetization configuration can correspond to the storage magnetization 230 being substantially perpendicular to the magnetic anisotropy axis 200. The plurality of stable or metastable configurations corresponds to a direction of the storage magnetization 230 that is substantially parallel to the magnetization anisotropy axis 200.

In the particular example of FIGS. 4a and 4b, the step of orienting the storage magnetization 230 in an unstable magnetization configuration can be performed by, in addition to heating the magnetic tunnel junction 2 to the predetermined high temperature, applying a programming magnetic field 42 oriented in a direction substantially perpendicular to the magnetic anisotropy axis 200 such that the storage magnetization 230 is aligned in that direction (FIG. 4a). The storage magnetization 230 is then relaxed randomly in one of the stable or metastable configurations by removing the programming magnetic field 42 and cooling the magnetic tunnel junction 2 at the predetermined low temperature. The storage magnetization 230 relaxes in a direction that is substantially parallel or antiparallel to the magnetic anisotropy axis 200 and that corresponds to a stable configuration of the storage magnetization 230 (FIG. 4b).

In an embodiment, the magnetic tunnel junction 2 comprises the storage antiferromagnetic layer 24 pinning the storage magnetization 230. In this configuration, the predetermined high temperature corresponds to the high threshold temperature $T_H$ such that the storage layer can be unpinned and can randomly switches from one to another of the plurality of stable or metastable configurations. The predetermined low temperature corresponds to the first low threshold temperature $T_{L1}$ such that the storage magnetization 230 is frozen in the stable configuration.

Figure 5B:
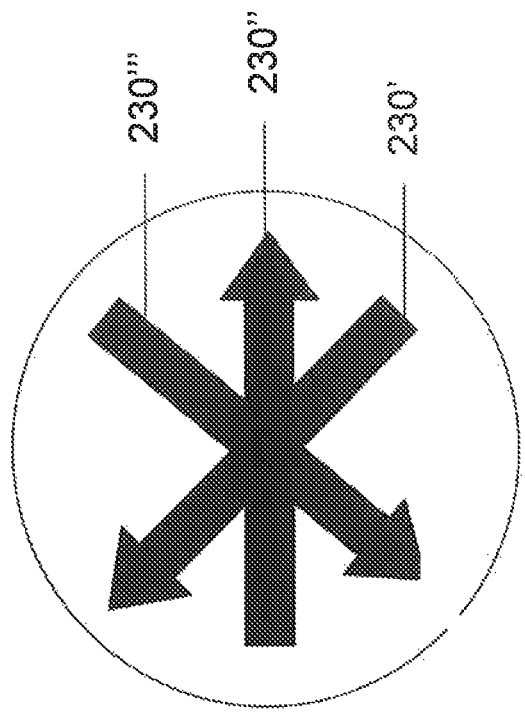
FIGS. 5a and 5b show a multilayered storage layer according to an embodiment.
Figure 5A:
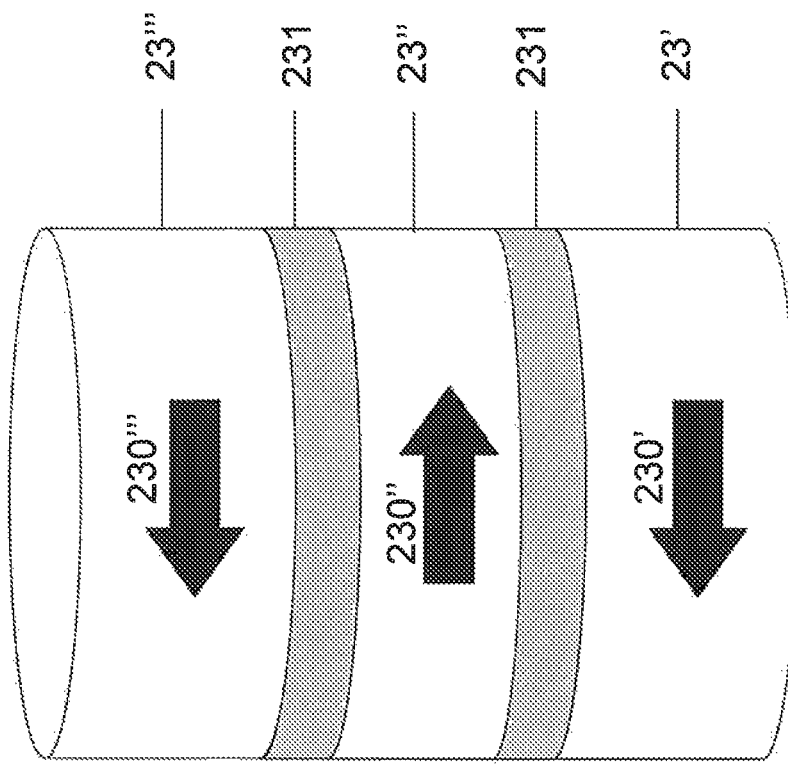

In another embodiment shown in FIGS. 5a and 5b, the storage layer 23 comprises a SAF configuration and includes three storage ferromagnetic layers 23', 23", 23"' and two storage coupling layer 231 sandwiched between the storage ferromagnetic layers 23', 23", 23"' (FIG. 5a). The storage coupling layer 231 can comprise a non-magnetic metal such as Ru, Ta, Cu, Mg, Al, Pt, Pd, Ag, W, Hf, Nb or Ti. The magnetic moment of the storage ferromagnetic layers 23', 23", 23"' and the thickness of the storage coupling layers 231 can be adjusted such that the sum of the magnetostatic energy and coupling energy across the storage coupling layers 231 results in a frustrated magnetic configuration. The frustrated configuration corresponds to a non-collinear arrangement of the storage magnetizations 230', 230", 230"'. An example of such a frustrated magnetic configuration is shown in FIG. 5b in which the storage magnetizations 230', 230", 230"' are aligned along the bisectors of an equilateral triangle due to the competition between the magnetostatic interactions and the magnetic coupling through the storage coupling layers 231. The frustrated magnetic configurations correspond to the metastable configurations of the storage magnetizations 230', 230'', 230'''. Such frustrated configurations can be obtained for a SAF storage layer 23 comprising any number of storage ferromagnetic layers 23', 23'', 23''', i.e., for a SAF storage layer 23 comprising n storage ferromagnetic layers 23', 23'', 23''' and n−1 storage coupling layers 231. The same above reasoning applies by replacing the n storage ferromagnetic layers 23', 23'', 23''' by n soft reference layers 21 and n−1 reference coupling layers 212.

In an embodiment, the storage coupling layers 231 are arranged such that the energy of the sum of the antiferromagnetically coupling and the magnetic coupling between the two outermost storage ferromagnetic layers 23', 23''' is substantially identical to the magnetostatic coupling energy between the outermost storage ferromagnetic layers 23', 23'''.

In another embodiment illustrated in FIGS. 6a to 6e showing a top view of the magnetic tunnel junction 2, the distance between the MRAM cells 100, or magnetic tunnel junctions 2, is smaller than the lateral size of a magnetic tunnel junction 2. For example, the lateral size of the magnetic tunnel junctions 2 can be between about 8 nm and about 500 nm, where the lateral size is the diameter of the magnetic tunnel junction 2 when the latter has a circular cross section. In such a configuration, the plurality of stable or metastable configurations is determined by the magnetostatic interactions between the adjacent magnetic tunnel junctions 2.

In particular, FIGS. 6a to 6e show an array of MRAM cells 100 arranged in an equilateral triangular lattice 60. The step of orienting the storage magnetization 230 in an unstable magnetization configuration is performed by, heating the magnetic tunnel junction 2 to the predetermined high temperature and/or applying a programming magnetic field 42 such as to align the storage magnetization 230 in accordance with the programming magnetic field 42 (FIG. 6a). In the array of FIGS. 6a to 6e, the magnetostatic interactions between the adjacent magnetic tunnel junctions 2 are such that the stable configurations are oriented along the bisectors 61 of the triangle lattice 60. Upon removing the programming magnetic field 42 and/or cooling the magnetic tunnel junction 2 at the predetermined low temperature, the storage magnetizations 230 will randomly relax from the unstable magnetization configuration to four possible stable configurations wherein the storage magnetizations 230 is pointing inside or outside the triangle 60 (FIGS. 6b to 6e) such as to minimize the energy of the system. The four possible stable configurations of FIGS. 6b to 6e have a substantially equivalent minimal energy with equal probability (25% probability of having the relaxed storage magnetizations 230 in the triangular arrangement 60 being aligned according to any one of the configurations of FIGS. 6b to 6e).

Figure 7:
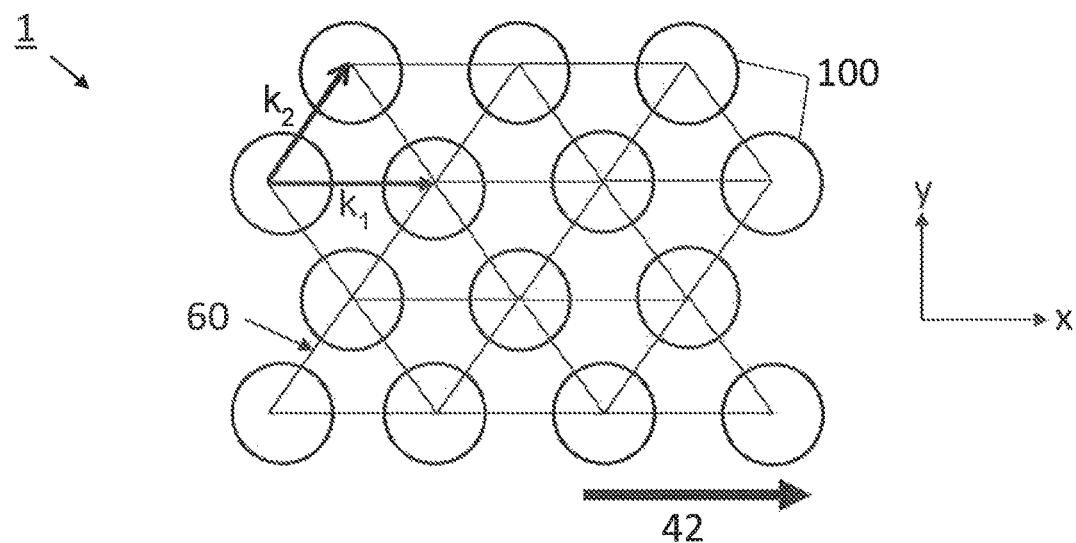
FIG. 7 illustrates the programmable magnetic device with the MRAM cells being arranged according to a repetition of a triangular lattice, according to an embodiment.

FIG. 7 illustrates the programmable magnetic device 1, showing a top view of the magnetic tunnel junction 2, according to another embodiment. In the example of FIG. 7, the MRAM cells 100 are arranged according to a repetition of a triangular lattice 60 along vectors $k_1$ and $k_2$.

Figure 8:
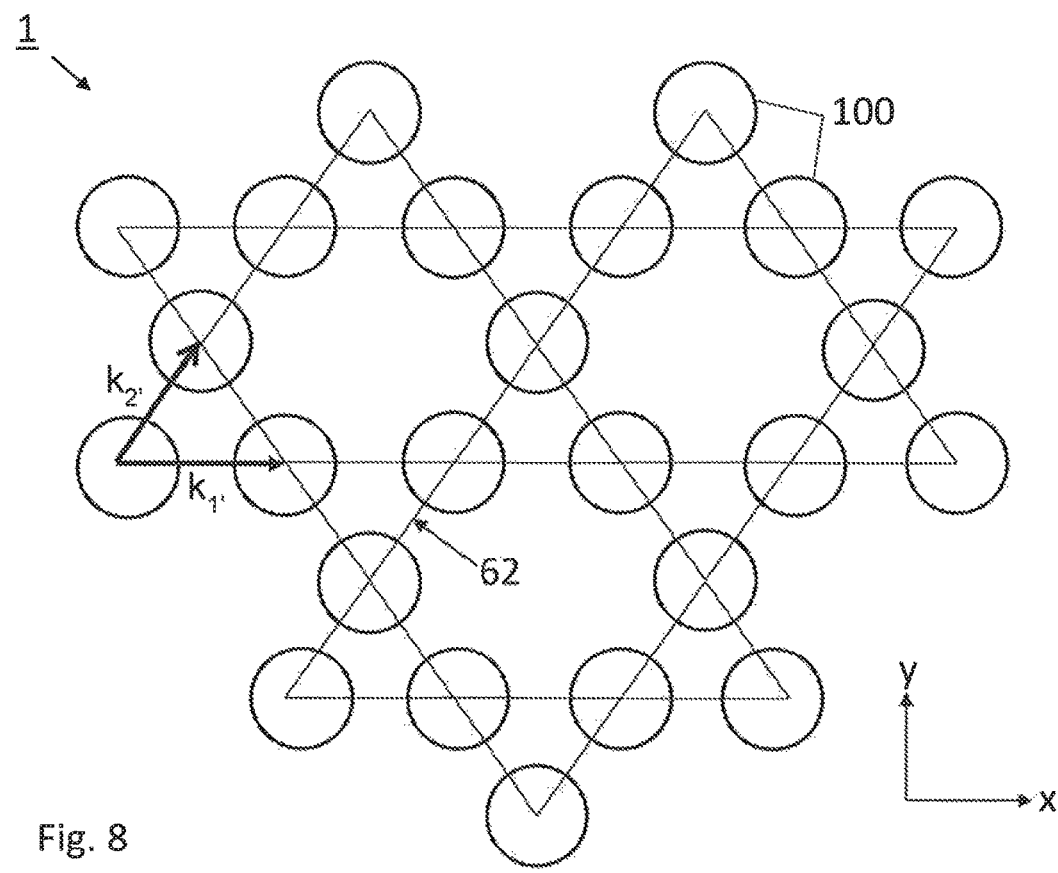
FIG. 8 illustrates the programmable magnetic device with the MRAM cells being arranged according to Kagome lattice, according to an embodiment.

FIG. 8 illustrates the programmable magnetic device 1, showing a top view of the magnetic tunnel junction 2, according to another embodiment, wherein the MRAM cells 100 are arranged according to a Kagome lattice 62, consisting in a repetition of a hexagonal lattice 62 along vectors $k_{1'}$ and $k_{2'}$.

The triangular lattice 60 and the hexagonal lattice 62 can be repeated n times along $k_1$ (or $k_{1'}$) and p times along $k_2$ (or $k_{2'}$), without restriction on the n and p numbers. The triangular lattice 60 and hexagonal lattice 62 arrangements of the programmable magnetic device 1 of FIGS. 7 and 8 are also called frustrated arrays. In such frustrated arrays the energy cannot be minimized leading to "singularities" having non-minimal energy that corresponds to the metastable configurations. The MRAM cells 100 arrangements of FIGS. 7 and 8 improves the randomness in the metastable configurations of the storage magnetization 230 compared to the stable configurations obtained in the single triangular MRAM cell arrangement of FIG. 6a.

Other two-dimensional arrays of the MRAM cells 100 are contemplated. In possible embodiments not represented, the programmable magnetic device 1 can comprise arrays of MRAM cells 100 formed by a repetition of polygonal lattices or quasi-crystal like lattices, both configurations leading to a frustrated configuration.

During the programming operation of the programmable magnetic device 1 comprising a frustrated array of MRAM cells 100, the storage magnetization 230 does not need to be aligned according to a particular orientation with respect to the storage anisotropy axis 200, but can be aligned in any direction.

It will be understood that in the case the reference layer 21 is unpinned, during the programming operation the soft reference magnetization 211 will also be oriented in the unstable magnetization configuration during the programming operation. The soft reference magnetization 211 will relax randomly in one of a plurality of stable or metastable configurations. The soft reference magnetization 211 will also be aligned in the programming magnetic field 42 and relaxed after the programming magnetic field 42 is turned off.

In an embodiment, at least part of the plurality of MRAM cells 100, or magnetic tunnel junctions 2, are electrically coupled in series to the current line 3 (see FIG. 1). A single current line 3 can be used to connect in series the plurality of MRAM cells 100, or a plurality of current lines 3 can be used to connect in series the MRAM cells 100 along a row. The MRAM cells 100 being connected to the current line 3 can be used for programming a random number. In FIGS. 7 and 8, a row of MRAM cells 100 can be along the x direction and a column of MRAM cells 100 can be along the y direction, or vice versa.

Figure 9A:
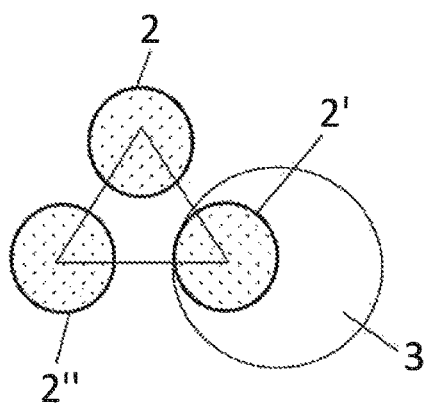
FIGS. 9a and 9b FIG. 9a represent a top view (FIG. 9a) and s side view (FIG. 9b) of an arrangement of three MRAM cells and connectors, according to an embodiment.
Figure 10A:
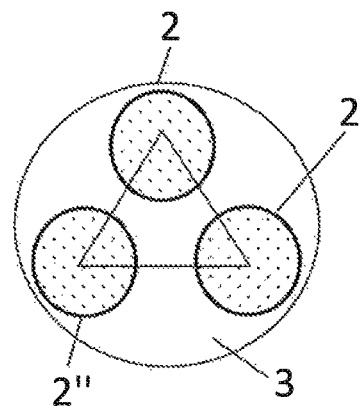
FIGS. 10a and 10b represent a top view (FIG. 10a) and s side view (FIG. 10b) of an arrangement of three MRAM cells and connectors, according to another embodiment.
Figure 9B:
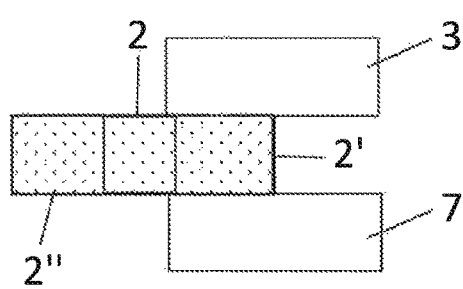
Figure 10B:
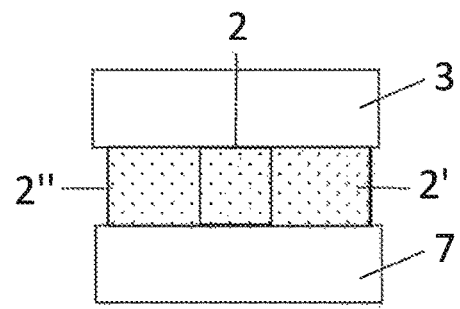

In the example of FIGS. 9a and 9b, only one of the MRAM cells 100 of the triangular array is connected to a current line 3 and to a strap 7. FIG. 9a is a top view of the array of MRAM cells 100 showing the connections 3, 7 and FIG. 9b is a side view. Alternatively, a single connection, for example comprising a current line 3 and a strap 7, can be used to connect several MRAM cells 100 in parallel. This is illustrated in FIG. 10a (top view) and in FIG. 10b (side view).

The magnetic device 1 can further include a set of field lines 4 (see FIG. 1) extending across the array of the MRAM cells 100 in a substantially parallel fashion with respect to one another, and in a substantially orthogonal fashion with respect to the current lines 3. Each of the field lines 4 can be magnetically coupled to the MRAM cells 100 along one column of the array.

In an embodiment, the magnetic tunnel junction 2 is heated at the predetermined high temperature, or the high threshold temperature $T_H$, by passing a heating current 31 in the current line 3. The magnetic tunnel junction 2 is cooled to the predetermined low temperature, or low threshold temperature $T_{L1}$, $T_{L2}$, by removing the heating current 31. The current line can be electrically connected in series to the magnetic tunnel junction 2 such that the heating current 31 is passed in the magnetic tunnel junction 2.

In an embodiment, applying the programming magnetic field 42 is performed by passing a field current pulse 41 in the current line 3 or in the field line 4. Alternatively, the programming magnetic field 42 can be applied by using an external magnet (not shown). The storage magnetization 230, and/or soft reference magnetization 211, can also be aligned by passing a spin polarized current pulse 33 in the magnetic tunnel junction 2 via the current line 3.

The field current pulse 41 inducing the programming magnetic field 42 and the heating current 31 can be passed simultaneously such that the storage magnetization 230 is oriented when freed by the heating of the magnetic tunnel junction 2 at the predetermined high temperature. Alternatively, the field current pulse 41 can be passed after the heating current, once the magnetic tunnel junction 2 has been heated at the predetermined high temperature.

Reading the Programmed Magnetic Device

According to an embodiment, a method for reading the random number programmed in the programmable magnetic device 1, comprises determining a programmed magnetic state of each of the magnetic tunnel junctions 2. The programmed magnetic state depends on the alignment between the storage magnetization 230 oriented in one of the plurality of stable or metastable configurations and the reference magnetization 210, 211. The programmed magnetic state can thus be determined by measuring a resistance R of the magnetic tunnel junction 2, for example, by passing a read current pulse 32 in the magnetic tunnel junction 2 via the current line 3 (with the selection transistor 8 in a saturated mode) and measuring a voltage across the magnetic tunnel junction 2. The programmed magnetic state can be determined by comparing the measured resistance R with the resistance of a reference memory cell.

In the case the magnetic tunnel junction 2 is implemented in a self-reference configuration, i.e., where the soft reference magnetization 211 can be readily varied under low-intensity magnetic fields during a read operation, while the storage magnetization 230 remains stable, the programmed state can be determined by using a self-referenced reading scheme. As part of a first read cycle, the soft reference magnetization 211 is adjusted in a first read direction; and a first junction resistance value $R_1$ is measured, using a the read current pulse 32 passing in the magnetic tunnel junction 2, via the current line 3, as described above. As part of a second read cycle, the soft reference magnetization 211 is adjusted in a second read direction; and a second junction resistance value $R_2$ is measured, by passing the read current pulse 32 in the magnetic tunnel junction 2, via the current line 3. The programmed state is thus determined from the difference between the first junction resistance value $R_1$ and the second junction resistance value $R_2$.

Adjusting the soft reference magnetization 211 during first and second read cycle can be performed by passing a read field current pulse 41' in the field line 4 or in the current line 3, inducing a read magnetic field 42'. The self-reference reading scheme allows for determining a programmed magnetic state of the magnetic tunnel junction 2 without requiring a comparison to a reference cell or a group of reference cells.

In another embodiment, the programmed magnetic state can be determined by inducing a set of read magnetic fields 42' to vary the soft reference magnetization 211. During a read operation of the programmed MRAM cell 100, at least one of the field line 4 and the current line 3 (functioning as another field line) is activated to induce a set of read magnetic fields 42' to vary the soft reference magnetization 211. Specifically, a read field current pulse 41' can be applied through the field line 4 to induce a read magnetic field 42' to vary a direction of the soft reference magnetization 211 accordingly. Alternatively, or in combination, a read field current pulse 41' can be applied through the current line 3 to induce a read magnetic field 42' to vary a direction of the soft reference magnetization 211 accordingly. Because the soft reference magnetization 211 is subject to little or no exchange bias (the reference layer is not exchange coupled by a pinning layer), the direction of the soft reference magnetization 211 can be readily varied under low-intensity magnetic fields and at a temperature being at the first low threshold temperature $T_{L1}$, while the direction of the storage magnetization 230 remains stable.

For certain implementations, the read operation is carried out in multiple read cycles, in which the field line 4 and the current line 3 (functioning as another field line) are activated to induce a set of resultant read magnetic fields 42' compatible with a read encoding scheme. Because the soft reference magnetization 211 can be aligned according to the resultant read magnetic fields 42', the soft reference magnetization 211 can be successively switched between m directions according to the read encoding scheme. For example, a first read cycle can generate a resultant read magnetic field 42' at an angle $\theta=0°$, a second read cycle can generate a resultant read magnetic field 42' at an angle $\theta=360°/2<n>$, a third read cycle can generate a resultant read magnetic field 42' at an angle $\theta=2(360°/2<n>)$, and so forth. In such manner, the storage magnetization 230 is rotated to m distinct values of $\theta$ according to the write encoding scheme.

As part of each read cycle, a degree of alignment between the storage magnetization 230 direction and the soft reference magnetization 211 direction is determined by applying the read current 32 though the magnetic tunnel junction 2 via the current line 3, with the selection transistor 8 in a saturated mode. Measuring a resulting voltage across the magnetic tunnel junction 2 when the read current 32 is applied yields a resistance value of the magnetic tunnel junction 2 for a particular read cycle and for a particular value of $\theta$. Alternatively, a resistance value can be determined by applying a voltage across the magnetic tunnel junction 2 and measuring a resulting current.

Resistance values $R_1$, $R_2$ for multiple read cycles are processed to determine which value of $\theta$ yielded a minimum resistance value, thereby yielding a stored multi-bit data value based on which of m logic states is assigned to that value of $\theta$. Processing of the resistance values can be carried out using a suitable controller in combination with, for example, a sample/hold circuit.

It is understood that the present disclosure is not limited to the exemplary embodiments described above and other examples of implementations are also possible within the scope of the patent claims. For example, the reference magnetization 210, soft reference magnetization 211 and/or storage magnetization 230 have been represented as being alignable in the plane of the reference and storage layer 21, 23, respectively. However, the storage magnetization 230 and/or reference magnetizations 210 and/or soft reference magnetization 211 can be alignable in a plane that is substantially perpendicular to the plane of the storage layer 23, respectively to the plane of the reference layer 21.

REFERENCE NUMBERS AND SYMBOLS 1 programmable magnetic device
100 MRAM cell 2 magnetic tunnel junction
200 storage anisotropy axis
21 axis
21', 21" reference ferromagnetic layer
210, 210', 210" reference magnetization
211 soft reference magnetization
22 reference layer
23 storage layer
23', 23", 23'" storage ferromagnetic layer
230, 230', 230", 230'" storage magnetization
231 storage coupling layer
24 storage pinning layer
26 reference pinning layer
3 current line
31 heating current pulse
32 read current
33 spin polarized current pulse
4 field line
41 field current pulse
41' read field current pulse
42 programming magnetic field
42' read magnetic field
60 triangular lattice
61 bisector
62 Kagome lattice
8 selection transistor
9 control lines
$k_1, k_2, k_{1'}, k_{2'}$ vectors
R resistance
$R_1$ first junction resistance
$R_2$ second junction resistance
$T_H$ high threshold temperature
$T_{L1}$ first low threshold temperature
$T_{L2}$ second low threshold temperature
K magnetic anisotropy
V magnetic volume
$k_B$ Boltzmann constant

What is claimed is:

1. A programmable magnetic device for generating random numbers during a programming operation, comprising an array of a plurality of magnetic tunnel junctions, each magnetic tunnel junction comprising a reference layer having a reference magnetization a tunnel barrier layer; and a storage layer having a storage magnetization;
the programmable magnetic device being arranged such that, during the programming operation, the storage magnetization is orientable in an unstable magnetization configuration and relaxable randomly in one of a plurality of stable or metastable configurations from the unstable magnetization configuration;
wherein said unstable magnetization configuration and said plurality of stable or metastable configurations are determined by magnetic interactions between adjacent the magnetic tunnel junctions within the array.

2. The programmable magnetic device according to claim 1,
wherein the storage layer comprises a magnetically synthetic antiferromagnetic (SAF) configuration including n storage ferromagnetic layers having a storage magnetization, and n−1 storage coupling layer; each storage coupling layer antiferromagnetically coupling two adjacent storage ferromagnetic layers;
such that said plurality of stable or metastable configurations correspond to non-collinear orientations of the storage magnetization in each storage ferromagnetic layers.

3. The programmable magnetic device according to claim 2,
wherein the storage coupling layers are arranged such that the energy of the sum of the antiferromagnetically coupling and the magnetic coupling between the two outermost storage ferromagnetic layers is substantially identical to the magnetostatic coupling energy between the outermost storage ferromagnetic layers.

4. The programmable magnetic device according to claim 1,
wherein the distance between the magnetic tunnel junctions is smaller than the lateral size of a magnetic tunnel junction, such that said plurality of stable or metastable configurations are determined by the magnetostatic interactions between adjacent magnetic tunnel junctions.

5. The programmable magnetic device according to claim 4,
wherein the lateral size of the magnetic tunnel junction is between about 8 nm and about 500 nm.

6. The programmable magnetic device according to claim 4,
wherein the array is arranged such as to form one of: a plurality of triangular array lattices of magnetic tunnel junctions, a Kagome lattice, a frustrated configuration comprising a plurality of polygonal array lattices of magnetic tunnel junctions or quasi-crystal like lattices.

7. The programmable magnetic device according to claim 1,
wherein the storage layer comprises a magnetic anisotropy axis; and
wherein said unstable magnetization configuration corresponds to a direction substantially perpendicular to the magnetic anisotropy axis and said plurality of stable or metastable configurations corresponds to a direction substantially parallel to the magnetic anisotropy axis.

8. The programmable magnetic device according to claim 1,
wherein said programming device comprises a current line adapted for passing a heating current pulse for heating at least a part of the magnetic tunnel junctions to a predetermined high temperature.

9. The programmable magnetic device according to claim 1,
wherein said programming device is further configured such as to induce a programming magnetic field adapted for orienting the storage magnetization.

10. The programmable magnetic device according to claim 8,
wherein the magnetic tunnel junction comprises a storage antiferromagnetic layer pinning the storage magnetization at a first low threshold temperature and freeing it at a high threshold temperature; and
wherein the heating current pulse is adapted for heating the magnetic tunnel junction to the high temperature threshold.

11. The programmable magnetic device according to claim 10,
wherein the reference magnetization is fixed or is freely orientable.

12. Method for operating a programmable magnetic device, comprising a programmable magnetic device for generating random numbers during a programming operation, comprising an array of a plurality of magnetic tunnel junctions, each magnetic tunnel junction comprising a reference layer having a reference magnetization; a tunnel barrier layer; and a storage layer having a storage magnetization;

the programmable magnetic device being arranged such that, during the programming operation, the storage magnetization is orientable in an unstable magnetization configuration and relaxable randomly in one of a plurality of stable or metastable configurations from the unstable magnetization configuration;

wherein said unstable magnetization configuration and said plurality of stable or metastable configurations are determined by magnetic interactions between adjacent magnetic tunnel junctions within the array;

the method comprising:

during a programming operation, heating the magnetic tunnel junction to a predetermined high temperature such as to orient the storage magnetization in the unstable magnetization configuration; and cooling the magnetic tunnel junction to a predetermined low temperature such as to let the storage magnetization relax randomly in one of said plurality of stable or metastable configurations; and during a read operation, determining the programmed state of the programmed magnetic tunnel junctions corresponding to the storage magnetization being oriented in one of said plurality of stable or metastable configurations.

13. The method according to claim 12, wherein the magnetic tunnel junction comprises a storage antiferromagnetic layer pinning the storage magnetization at a low threshold temperature and freeing it at a high threshold temperature; and wherein said predetermined high temperature corresponds to the high temperature threshold and said predetermined low temperature corresponds to the low threshold temperature.

14. The method according to claim 12, comprising, during a programming operation, generating a programming magnetic field adapted for orienting the storage magnetization.

15. The method according to claim 12 comprising, during a programming operation, generating a programming magnetic field adapted for orienting the storage magnetization in accordance with the programming magnetic field; and in combination, heating the magnetic tunnel junction to a predetermined high temperature; the programming magnetic field being generated when the magnetic tunnel junction is heated at the predetermined high temperature.

16. The method according to claim 12, wherein determining the programmed magnetic state comprises passing a read current pulse in the current line such as to measure a resistance of each of the magnetic tunnel junctions.

17. The method according to claim 16, wherein the reference magnetization is freely orientable; and wherein determining the programmed magnetic state is performed by using a self-reference reading scheme.

* * * * *